(12) United States Patent
Ashikawa

(10) Patent No.: US 6,515,828 B1
(45) Date of Patent: Feb. 4, 2003

(54) MAGNETIC TAPE CASSETTE WITH POSITION REGULATING RIB

(75) Inventor: Teruo Ashikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/601,609

(22) PCT Filed: Feb. 18, 1999

(86) PCT No.: PCT/JP99/00727
§ 371 (c)(1),
(2), (4) Date: Aug. 4, 2000

(87) PCT Pub. No.: WO99/42998
PCT Pub. Date: Aug. 26, 1999

(30) Foreign Application Priority Data

Feb. 20, 1998 (JP) ............................................ 10-039323

(51) Int. Cl.[7] .............................................. G11B 23/02
(52) U.S. Cl. ........................................ 360/132; 242/343
(58) Field of Search ........................... 360/132; 242/343, 242/345, 346, 347

(56) References Cited

U.S. PATENT DOCUMENTS

| | | | | |
|---|---|---|---|---|
| 4,607,307 A | * | 8/1986 | Sieben | ........................ 360/132 |
| 4,679,110 A | * | 7/1987 | Schoettle et al. | ............ 360/132 |
| 5,056,735 A | * | 10/1991 | Gelardi et al. | ............... 360/132 |
| 5,887,813 A | * | 3/1999 | Ney et al. | .................... 242/343 |
| 6,155,510 A | * | 12/2000 | Solomon et al. | ............ 242/343 |

* cited by examiner

Primary Examiner—Jefferson Evans
(74) Attorney, Agent, or Firm—Sughrue Mion, PLLC

(57) ABSTRACT

The magnetic tape cassette comprises a reel, a cassette half (4), a reel locking member (45) and a rib (6a or 6b). The reel on which the magnetic tape is wound turns on a predetermined track and has engaging teeth at its periphery. The cassette half has a reel accommodating area which can accommodate various kinds of reels which are different from one another. The reel lock member is disposed on the cassette half and has an engagement pawl. The reel lock member is slidable between a reel lock position where the engagement pawl of the reel lock member is engaged with the engaging teeth of the reel so as to inhibit a rotation of the reel and a releasing position where the reel lock member disengages from the engaging teeth of the reels so as to allow the rotation of the reel. The rib disposed on the cassette half keeps a locking condition, i.e., where the engagement pawl is engaged with the engaging teeth, when the reel leaves the predetermined tracks. Accordingly, independently of the outside diameter of reels accommodated therein, the rotation of the reels can be positively stopped.

4 Claims, 10 Drawing Sheets

MAGNETIC TAPE CASSETTE WITH POSITION REGULATING RIB

TECHNICAL FIELD

This invention relates to a magnetic tape cassette comprising reels on which a magnetic tape is wound, and a reel lock member which is engageable with the teeth of the reels.

BACKGROUND ART

Magnetic tape cassettes are popularly employed as recording media. FIG. 7 is an exploded perspective view of a DVC (digital video cassette), namely, a magnetic tape cassette 20.

As shown in FIG. 7, the magnetic tape cassette 20 comprises a cassette body, a magnetic tape (not shown) and an opening and closing lid 27. The cassette body comprises opening 21 an upper cassette half 22 and a lower cassette half 23. In front portion of the cassette body (left side in FIG. 7), the cassette body possesses opening 21 for inserting a tape pull-out member equipped in a video tape recorder (VTR). The magnetic tape (not shown) is laid tight in the opening 21 with the aid of tape guides 37 and 38 which are provided on the front surface of the cassette body. The opening and closing lid 27 is provided on the front of the cassette body, and comprises an outer lid (or front lid) 29, a top lid (or upper lid) 30 and an inner lid (or rear lid) 31.

In the lower cassette half 23, a pair of reels 35 and 36 are rotatably provided and a magnetic tape is wound on the reels 35 and 36. The reels 35 and 36 comprise disk-shaped upper flanges 39 and 40 and disk-shaped lower flanges 41 and 42. The disk-shaped lower flanges 41 and 42 are integrally molded with cylindrical hubs 41a and 42a, and have engaging teeth 43 and 44 along the whole peripheries thereof, respectively.

When the magnetic tape cassette 20 is not loaded in a device such as a VTR, i.e., when the cassette is stored or carried, the magnetic tape has the possibility to be slackened. In order to prevent the magnetic tape from being slackened, a reel lock member 45 and a lock spring 46 are provided. The reel lock portion 45 is provided in the space formed on the rear side of the cassette and between the reels 35 and 36, and functions to prevent the rotation of the reels 35 and 36. The lock spring 46 is provided and adapted to urge the reel lock member 45.

On the other hand, recently there has been a strong demand for an increase in recording capacity. However, the outer dimensions of the cassette body cannot be increased so much because of the dimensional limits of the hardware side. Therefore, the following method has been employed: the hub diameter of the reels, on which the magnetic tape is wound, is decreased in diameter, and the flange diameter of the reels is increased, while the reel accommodating area of the cassette half which is adapted to accommodate the reels is increased. For instance, as shown in FIG. 8, the reel accommodating areas 50 of the lower half 23 are made larger than those of the prior art according to the large diameter reels 35a of which flange diameter $d_1$ is larger.

FIG. 9 is an exploded diagram of the lower half 23a which accommodates reels 35b having an ordinary flange diameter $d_2$, showing only the left reel for simplification in description. As shown in FIG. 9, in order to stop the rotation of the reel 35b, the engaging pawls 45a of the reel lock member 45 are engaged with the engaging teeth 43b of the reels 35b. However, since the reel accommodating area 50 is formed according to the large diameter reel 35a the flange of which is large in diameter, as shown in FIG. 10, when the cassette is dropped or vibrated the reel 35b having the ordinary flange diameter may be shifted to the front and to the side, or leave a track. Then, as shown in FIG. 11, when it is intended to stop the rotation of the reel, the engaging pawl 45a of the reel lock member 45 cannot engage with the engaging teeth 43b of the reel 35b.

DISCLOSURE OF THE INVENTION

In view of the foregoing, an object of the invention is to provide a magnetic tape cassette in which, regardless of the outside diameter of the reels accommodated therein, the rotation of the reels can be positively stopped.

The above-mentioned object can be achieved by a magnetic tape cassette comprising:

a reel on which a magnetic tape is wound and which turns on a predetermined track and has an engaging teeth at its periphery;

a cassette half having a reel accommodating area which is accommodatable various kind of reels which are different in an outside diameter from one another;

a reel lock member disposed on the cassette half and having an engagement pawl, the reel lock member being slidable between a reel lock position where the engagement pawl of the reel lock member is engaged with the engaging teeth of the reel so as to inhibit a rotation of the reel and a releasing position where the reel lock member disengages from the engaging teeth of the reels so as to allow the rotation of the reel; and a rib disposed on the cassette half for keeping a locking condition where the engagement pawl is engaged with the engaging teeth, when the reel leaves from the predetermined tracks.

In the above construction of the magnetic tape cassette according to present invention, it is preferable that the rib is substantially confronted with a tip end of the engagement pawl about a center of the reel.

In the above construction of the magnetic tape cassette according to the present invention, it is preferable that the shortest distance defined between the rib and the tip end of the engagement pawl of the reel locking member, which is located in the reel lock position, is shorter than the outside diameter of the reel.

In the above construction of the magnetic tape cassette according to present invention, it is preferable that the engagement pawl is extended in a line, and the rib is substantially disposed on the line.

Further, in the above construction of the magnetic tape cassette according to present invention, it is preferable that the cassette half is formed by injection molding with a main metal mold, and the rib is formed by injection molding with an insert mold which is attachable to the main metal mold.

The above-mentioned object can be also achieved by a metal mold, according to a present invention, used for manufacturing a magnetic tape cassette including, a reel on which a magnetic tape is wound and which turns on a predetermined track and has a engaging teeth at its periphery, a cassette half having a reel accommodating area which is accommodatable various kind of reels which are different in its outside diameter, a reel lock member disposed on the cassette half and having an engagement pawl, the reel lock member being slidable between a reel lock position where the engagement pawl of the reel lock member is engaged with the engaging teeth of the reel so as to inhibit a rotation of the reel and a releasing position where the reel lock member disengages from the engaging teeth of the reels so as to allow the rotation of the reel, and a rib disposed on the cassette half for keeping a locking condition where the engagement pawl is engaged with the engaging teeth, when the reels leave from the predetermined tracks, the metal mold comprising:
a main metal mold portion forming the cassette half by an injection molding; and
an insert metal mold portion being attachable to the main metal mold portion for forming the rib by the injection molding simultaneously.

According to the invention, even with a cassette half having a reel accommodating area in correspondence to maximum diameter reels, when the reel accommodated therein leaves the track, the rib provided in the reel accommodating area regulates the position of the reel to the reel lock position, so that the reel lock member stops the rotation of the reel. Accordingly, even when the cassette for instance drops to cause the reel leave the track, the rotation of the reel can be positively stopped, and accordingly the magnetic tape will never be slackened.

Furthermore, in the magnetic tape cassette, a part of a metal mold adapted to form the cassette half by injection-molding which is to form the rib is an insert metal mold portion, and the rib is formed by injection molding with the insert metal mold portion set in the metal mold.

In the use of the metal mold, the rib of the cassette half is formed by injection molding with the insert metal mold inserted therein. Accordingly, it is unnecessary to set a stationary metal mold and a movable metal mold in a molding machine separately according to whether or not the lower half has the position regulating rib. Owing to this feature, the magnetic tape cassette can be manufactured with high efficiency and at low cost.

BEST MODE FOR CARRYING OUT THE INVENTION

Figure 1:
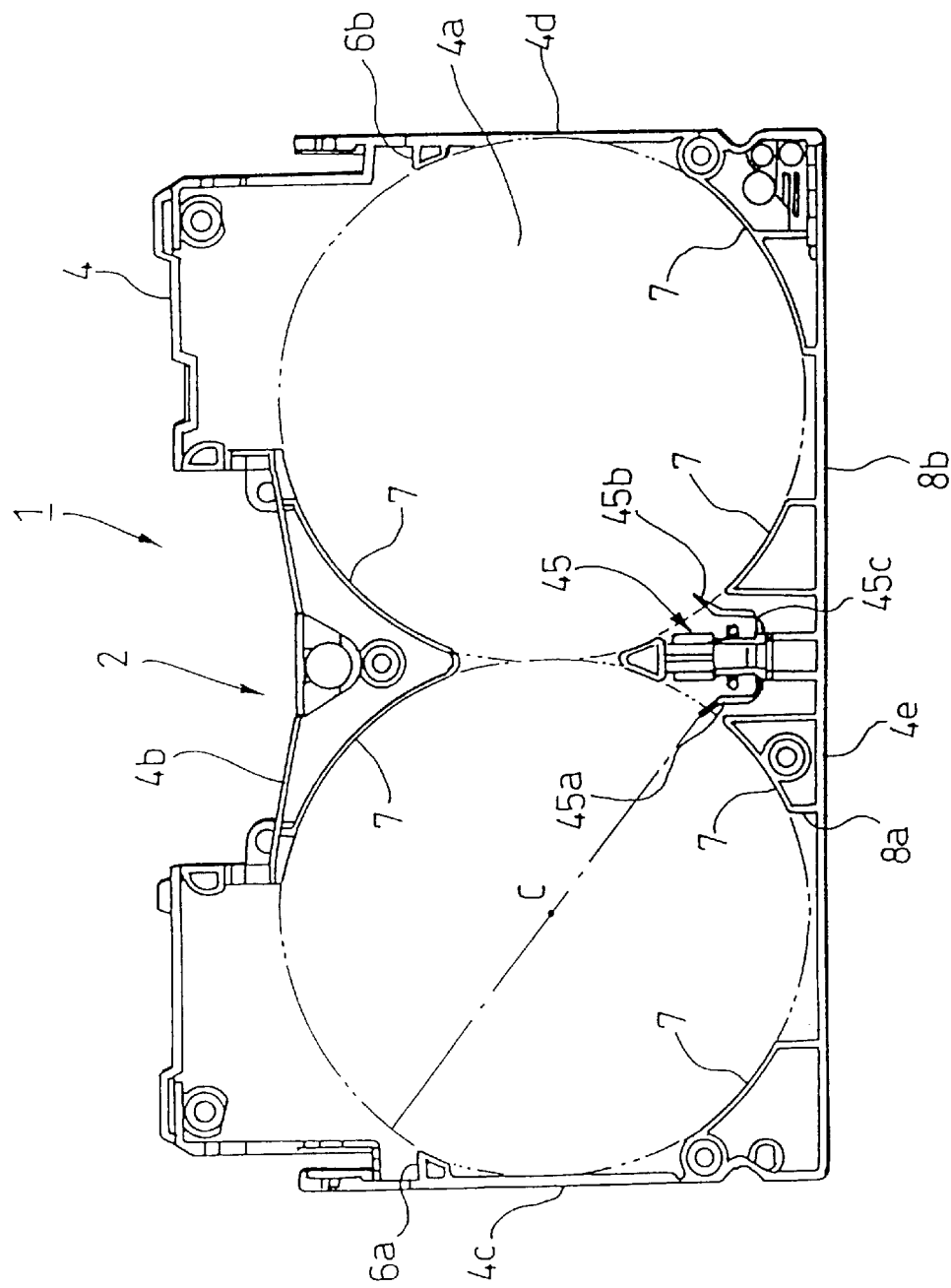
FIG. 1 is a diagram showing the inside of a lower cassette half of magnetic tape cassette, which constitutes a preferred embodiment of the invention.

One preferred embodiment of the invention will be described with reference to the accompanying drawings in detail, in which parts corresponding functionally to those already described with reference to the prior art are therefore designated by the same reference numerals or characters. FIG. 1 is a diagram showing the inside of a lower cassette half 4 of a magnetic tape cassette 1, the embodiment of the invention. As shown in FIG. 1, the lower cassette half 4 is substantially rectangular, and comprises: a flat plate section 4a; a front wall 4b which is vertical to the flat plate section 4a, and provided on the side of a cassette opening section 2; side walls 4c and 4d which is also vertical to the flat plate section 4a; and a rear wall 4e which is also vertical to the flat plate section 4a.

The flat plate section 4a has reel accommodating areas 7 which defines positions of a pair of reels. The reel accommodating areas 7 are vertical to the flat plate section 4a, and curved along the outer peripheries of the reels. In order to use the reel accommodating areas 7 as a cassette half which is used to accommodate large diameter reels which are larger than ordinary ones, the size of the reel accommodating areas 7 corresponds to the large diameter reel. However, the configuration and dimension of the lower cassette half 4 is equal to those of the conventional one because of the limits on the hardware side.

Between the rear wall 4e of the lower cassette half 4 and a pair of reels, substantially triangular ribs 8a and 8b are provided which are part of the reel accommodating areas 7.

Between those ribs 8a and 5b and at the middle of the lower cassette half 4, a reel lock member 45 is slidably accommodated which is adapted to stop the rotation of the reels.

The reel lock member 45 comprises a slide barrel 45c, and engaging pawls 45a and 45b which are provided on the front end face of the slide barrel 45c, and are engageable with reel engaging teeth. When the reel lock member 45 is slid towards the front of the cassette, the reel lock member 45 reaches a reel lock position where it is engaged with the reel engaging teeth; and when it is slid towards the rear of the cassette, the reel lock member 45 reaches a reel unlock position where it is disengaged from the reel engaging teeth.

Position regulating ribs 6a and 6b are provided on the side surfaces 4c and 4d in such a manner that they are vertical to the flat plate 4a. The position regulating ribs 6a and 6b are parts of the reel accommodating areas and are adapted to regulate the reel position. It is preferable that the position regulating ribs 6a and 6b are located on the prolongations of the engaging pawls 45a and 45b of the reel lock member 45 because the engaging pawls 45a and 45b are positively engaged with the reel engaging teeth. However, in order to prevent the magnetic tape wound on the reels from interfering with the ribs, in the embodiment the position regulating ribs 6a and 6b are located at the positions which are slightly back from the prolongations. The size of each of the position regulating ribs 6a and 6b is set to a suitable value so that, when the reel is shifted from the track, the position of the reel is regulated to the reel lock position. The size of the position regulating ribs should be changed suitably according to the outside diameter of the reels accommodated therein.

Figure 2:
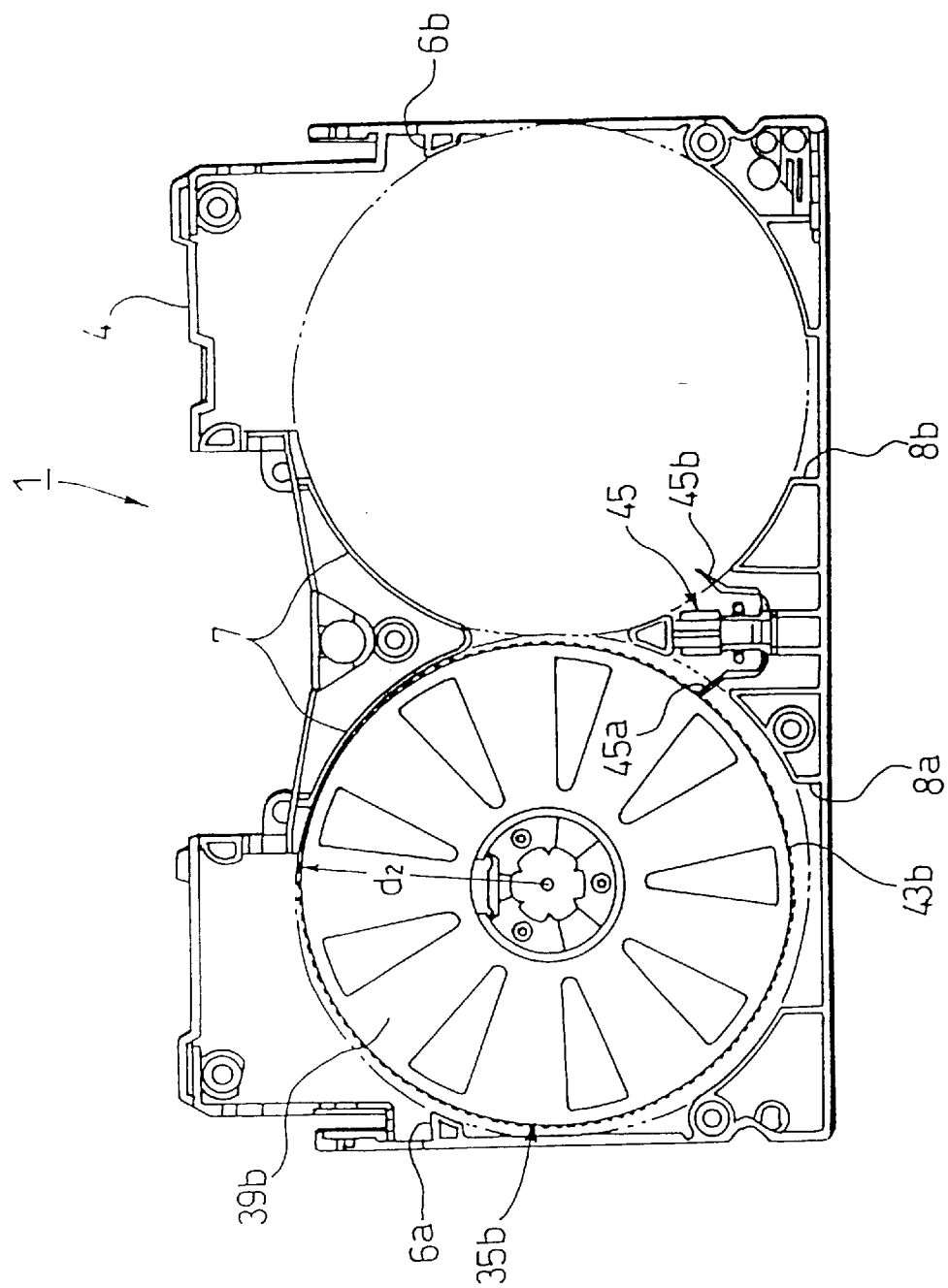
FIG. 2 is an exploded view showing the lower cassette in which the ordinary reel is accommodated.
Figure 3:
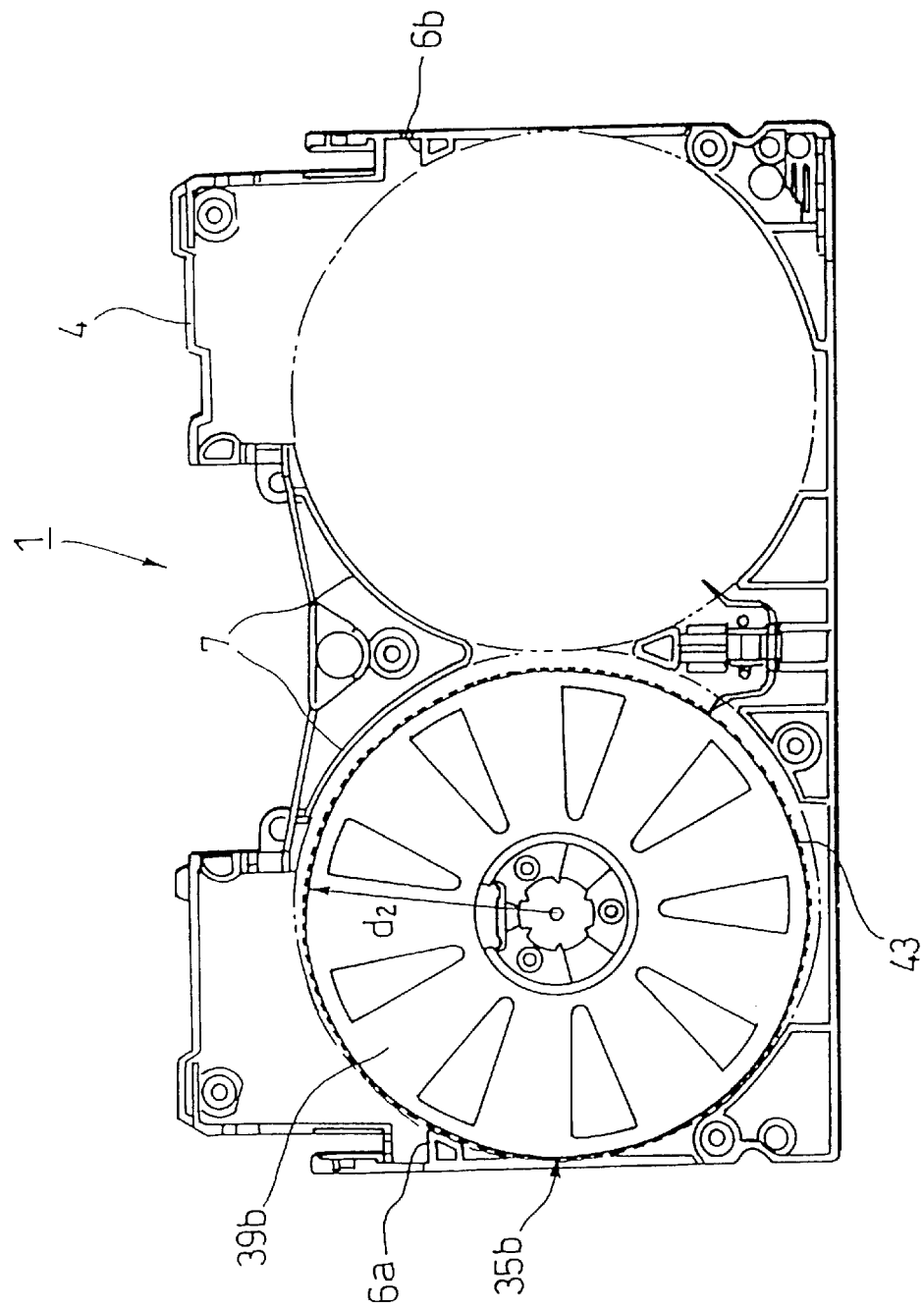
FIG. 3 is an exploded view of the lower cassette in the case where the ordinary reel is shifted upwardly and sidewardly.
Figure 4:
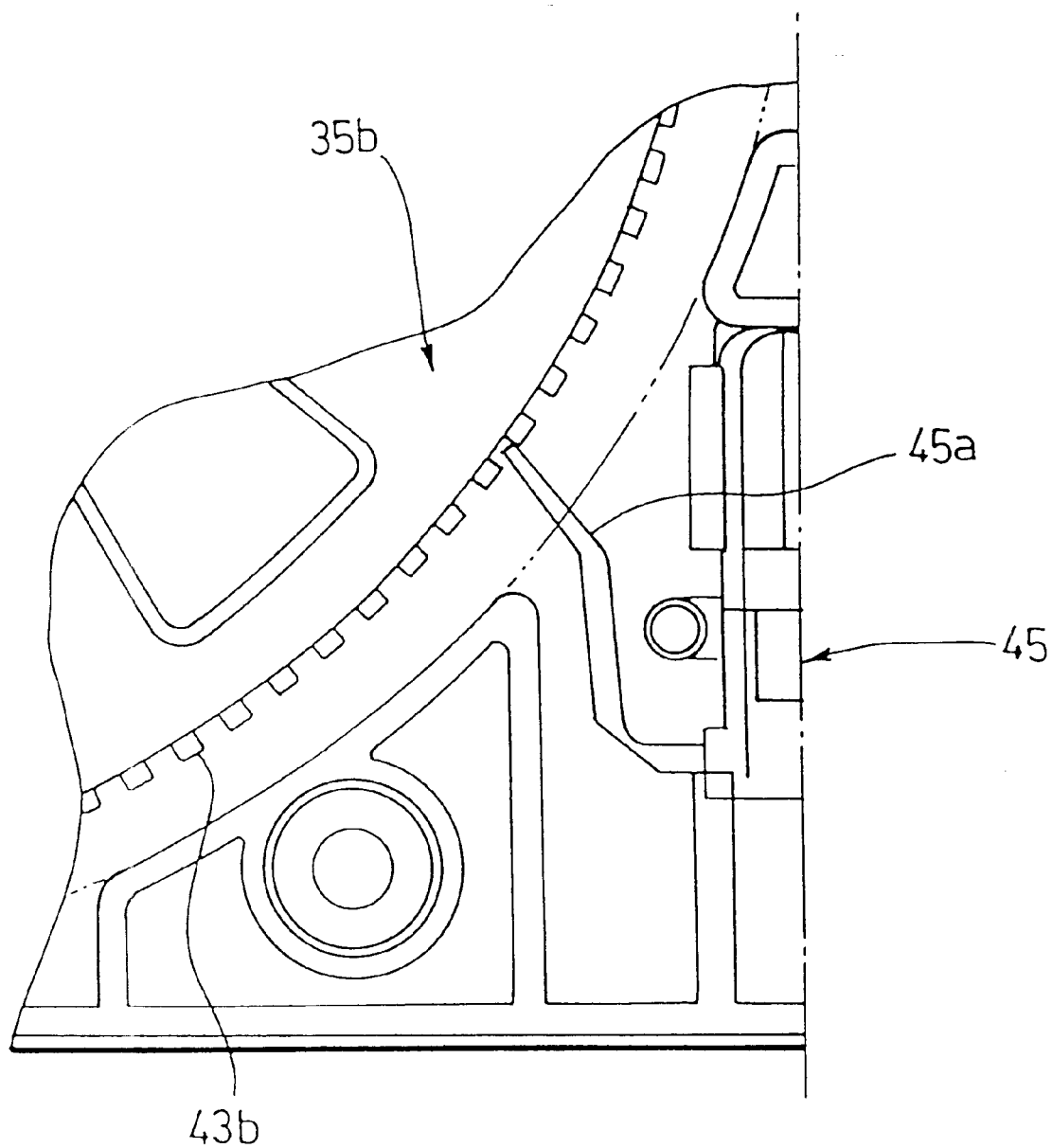
FIG. 4 is an enlarged diagram of a part of FIG. 3.

FIG. 2 is an exploded diagram showing the lower half 4 in which a reel 35 is accommodated which has engaging teeth 43b having a conventional outside diameter. As shown in FIG. 2, when it is required to stop the rotation of the reel 35b, the engaging pawl 45a of the aforementioned reel lock member 45 is engaged with the engaging teeth 43b of the reel 35b. As shown in FIG. 3, when the reel 35b is shifted forwardly and sidewardly when the cassette is dropped or vibrated; that is, the reel 35*b* is left from the reel track, the position regulating rib 6*a* regulates the position of the reel 35*b* to the reel lock position. That is, as shown in FIG. 4, the engaging pawl 45*a* of the reel lock member 45 stops the rotation of the reel 35*b*. Accordingly, even in the case of the conventional reel which is smaller in diameter than the large-diameter reel, the rotation of the reel can be positively stopped. Hence, even when the cassette is dropped so that the reel is left from the track, the magnetic tape is prevented from slackening.

Note that a rib 6*a* or 6*b* is disposed on the lower cassette half 4 for keeping a locking condition where the engagement pawl 45*a* or 45*b* is engaged with the engaging teeth of the reel, when the reel leaves from its predetermined track. In addition, the rib 6*a* and 6*b* is positioned at a position which is substantially opposite from a tip end of the engagement pawl 45*a* or 45*b* about a center of the reel, as shown in FIG. 1. Further, as shown in FIG. 1, the shortest distance defined between the rib and the tip end of the engagement pawl of the locking member which is located in the reel lock position is shorter than the outside diameter of the reel. Moreover, the engagement pawl is extended in a line as shown in FIG. 1, and the rib is substantially disposed on the line.

Figure 5:
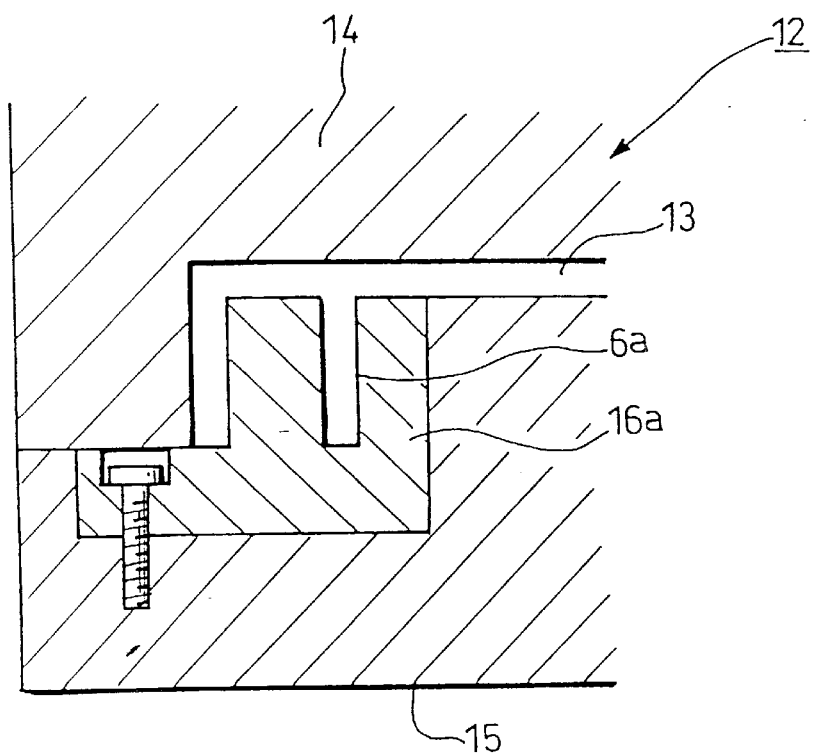
FIG. 5 is a sectional view of a metal mold for forming a lower half of the type provided with a position regulating rib.

Now, a method of manufacturing the lower half 4 will be described. FIG. 5 is a sectional view of a metal mold 12 for manufacturing the lower half 4. The metal mold 12 comprises a stationary metal mold 14, a movable metal mold 15 and an insert metal mold 16*a*. The metal mold 12 defines a cavity 13 for forming the lower half 4. When the metal mold 12 is clamped, the cavity 12 is filled with molten resin by injection. And after the resin is pressurized, it is cooled and solidified. Thus, the lower half 4 has been formed.

Figure 6:
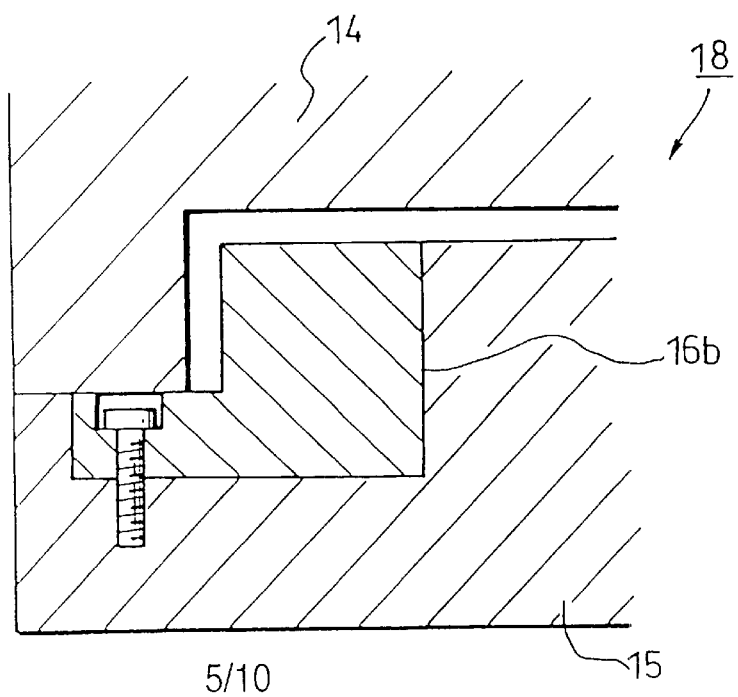
FIG. 6 is a sectional view of a metal mold for forming a lower half of the type provided without a position regulating rib.
Figure 7:
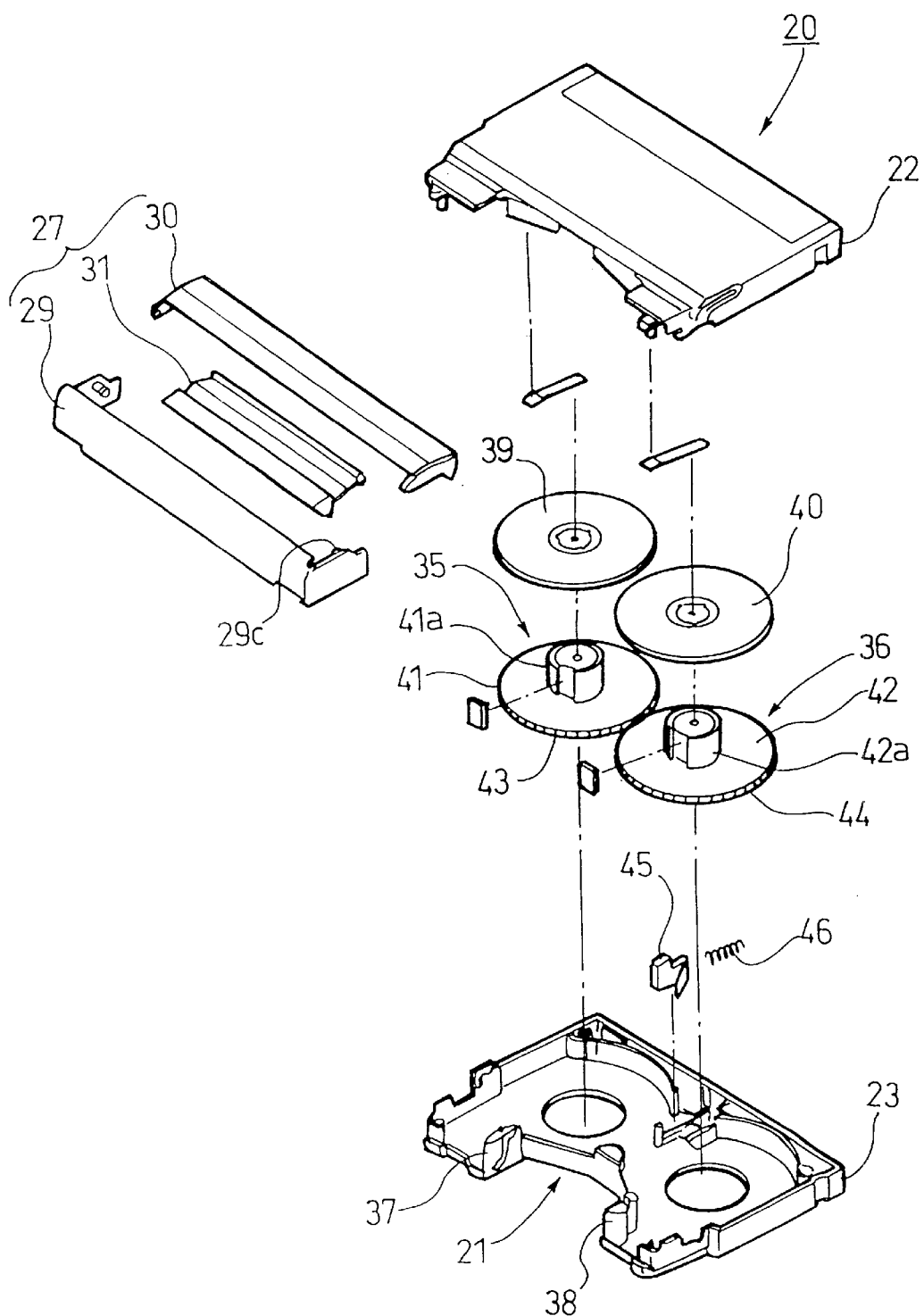
FIG. 7 is an exploded perspective view of a conventional magnetic tape cassette.
Figure 8:
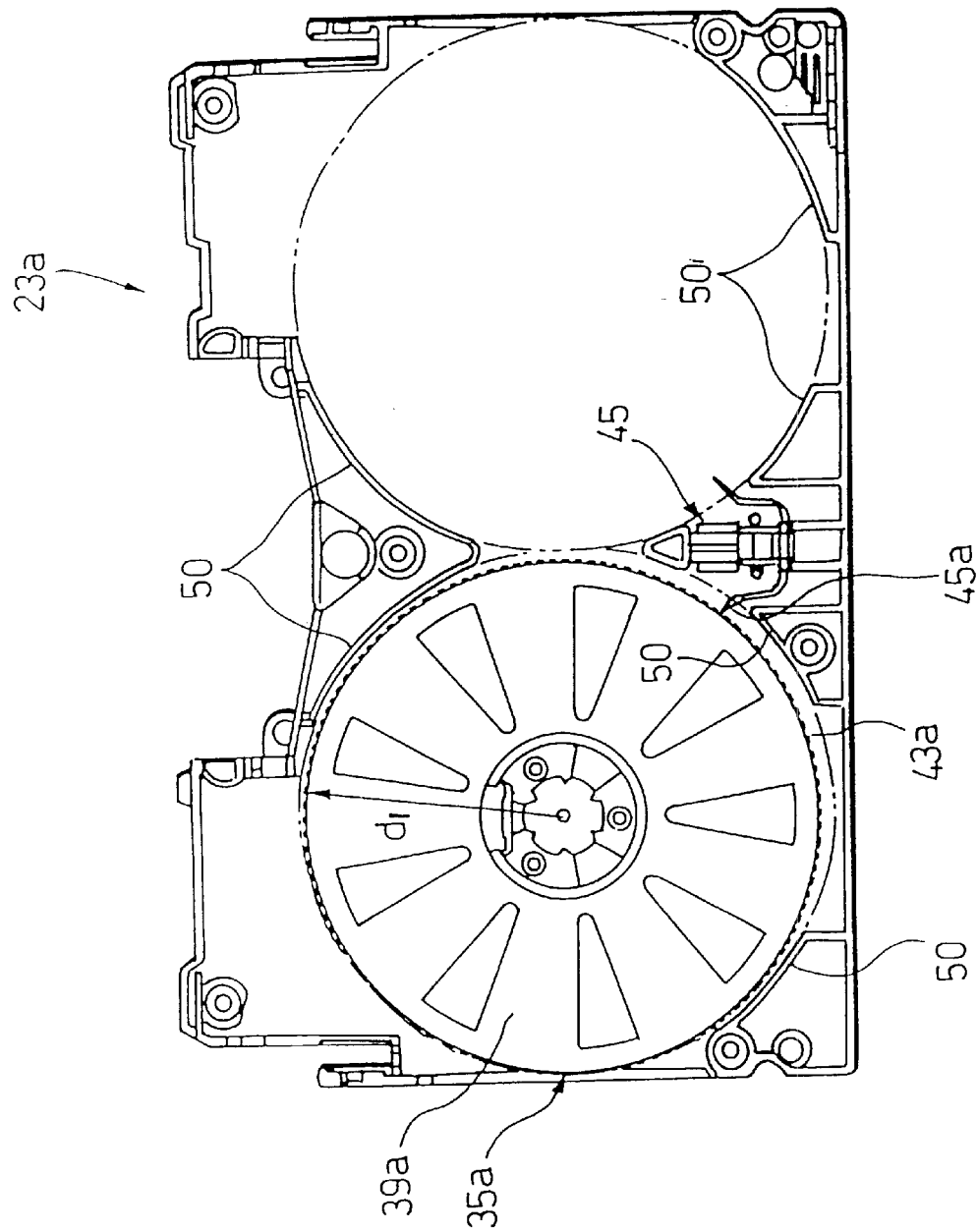
FIG. 8 is an exploded view of the conventional lower cassette half in which a large-diameter reel is accommodated.
Figure 9:
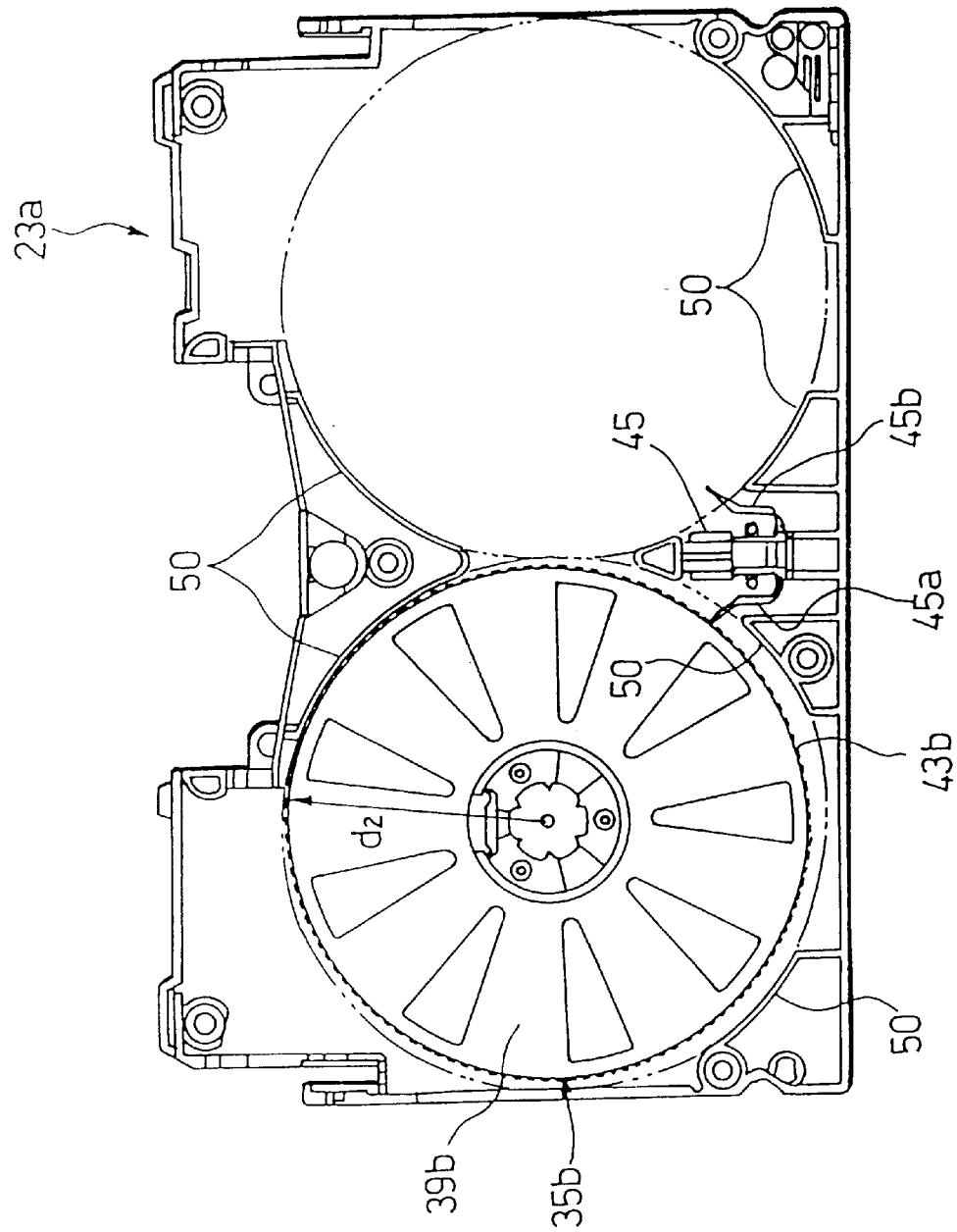
FIG. 9 is an exploded view of the conventional lower cassette half in which the ordinary reel is accommodated.
Figure 10:
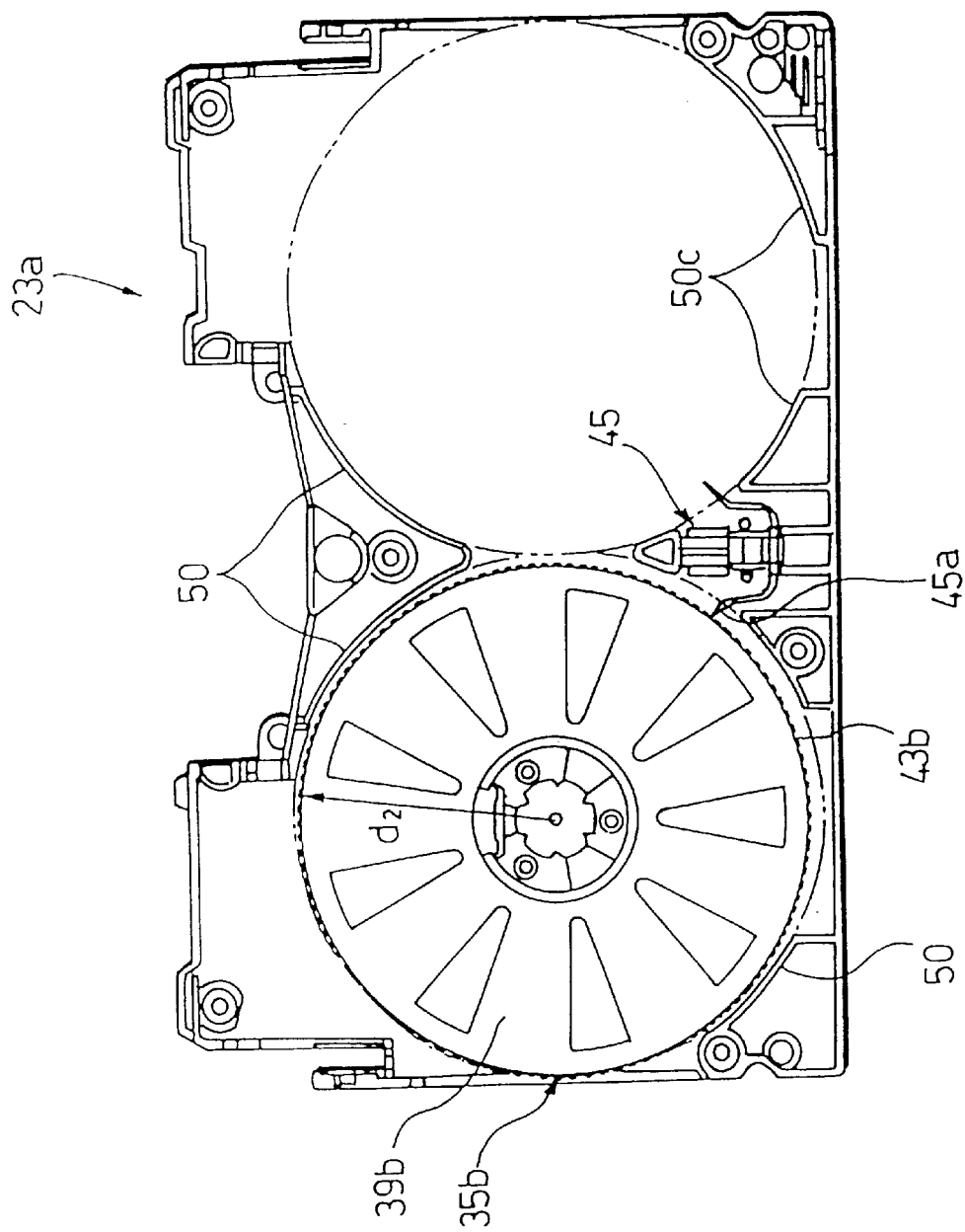
FIG. 10 is a diagram showing the inside of the lower cassette half in the case where the ordinary reel is shifted upwardly and sidewardly.
Figure 11:
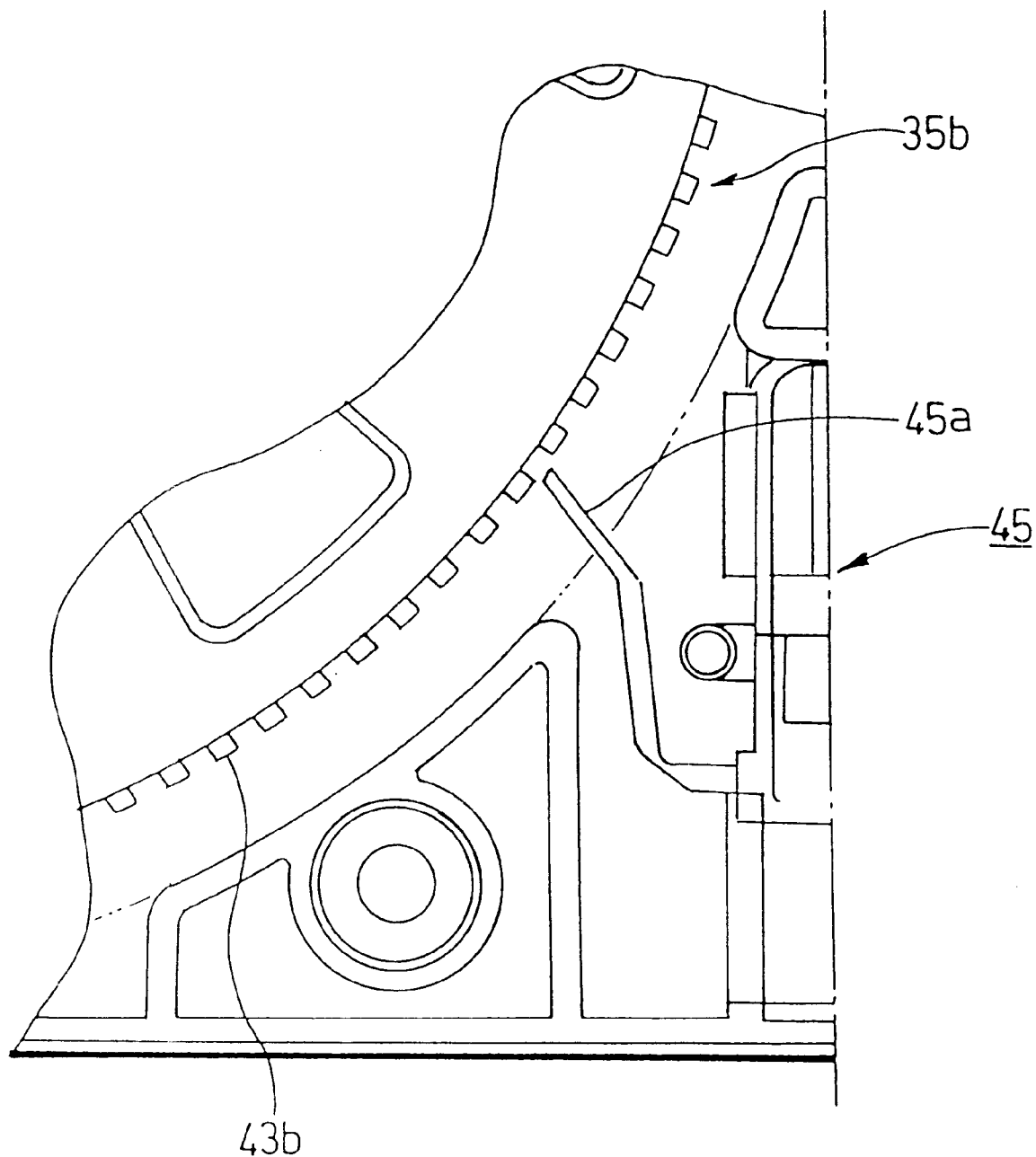
FIG. 11 is an enlarged diagram of a part of FIG. 10.

The aforementioned position regulating rib 6*a* is formed with the insert metal mold secured to the movable metal mold 15. FIG. 6 is a sectional view of a metal mold 18 adapted to form a lower half 4 of the type that it has no position regulating rib 6*a*. As is seen from FIG. 6, the metal mold 18 uses the same stationary and movable metal molds 14 and 15 as the aforementioned metal mold 12. And, instead of the insert metal mold 16*a*, an insert metal mold 16*b* of the type that is has no groove to form the position regulating rib 6*a*. It should be noted that, by changing the insert metal mold, a different lower half can be formed. Accordingly, it is unnecessary to set a stationary metal mold and a movable metal mold in a molding machine separately according to whether or not the lower half has the position regulating rib. Owing to this feature, the magnetic tape cassette can be manufactured with high efficiency and at low cost.

While there has been described in connection with the preferred embodiment of the invention, the invention is not limited thereto or thereby; that is, it will be obvious to those skilled in the art that various changes and modifications may be made therein without departing from the invention. For instance, the magnetic tape cassette is not limited to a DVC; that is, the technical concept of the invention is applicable to a variety of cassettes. In addition, in the above-described embodiment, the position regulating rib is formed on the lower half; however, it may be provided on the upper half. Furthermore, it is preferable that the position regulating rib is positioned substantially on the prolongation of the engaging pawl of the reel lock member and is shifted slightly backwardly, and that it is positioned within the range of 90° between the forward and sideward directions of the center of the reel. In this case, the rotation of the reel can be positively locked.

INDUSTRIAL APPLICABILITY

As was described above, in the invention, the reel accommodating area is able to accommodates reels different in outside diameter, and the rib is provided in the reel accommodating area which, when the reel leaves from the track, regulates the position of the reel to the reel lock-position. Hence, the reel lock member is able to stop the rotation of the reel. Accordingly, even when the cassette for instance drops to cause the reel leave the track, the rotation of the reel can be positively stopped, and accordingly the magnetic tape will never be slackened.

Furthermore, the part of the metal mold adapted to form the cassette half by injection molding which forms the rib is the insert metal mold. The rib of the cassette half is formed by injection molding with the insert metal mold inserted therein. Accordingly, it is unnecessary to set the stationary metal mold and the movable metal mold in the molding machine separately according to whether or not the lower half has the position regulating rib. Owing to this feature, the magnetic tape cassette can be manufactured with high efficiency and at low cost.

This application claims the benefit of Japanese Application No. Hei. 10-39323 which is hereby incorporated by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A magnetic tape cassette comprising:
   a reel, on which a magnetic tape is wound, which turns on a predetermined track and has engaging teeth at its periphery;
   a cassette half having a reel accommodating area which is capable of accommodating various kinds of reels which are different in an outside diameter from one another;
   a reel lock member disposed on said cassette half and having an engagement pawl, said reel lock member being slidable between a reel lock position where said engagement pawl of said reel lock member is engaged with said engaging teeth of said reel so as to inhibit a rotation of said reel and a releasing position where said reel lock member disengages from said engaging teeth of said reel so as to allow the rotation of said reel; and
   a rib disposed on said cassette half for keeping a locking condition where said engagement pawl is engaged with said engaging teeth when said reel leaves from said predetermined track,
   wherein said rib is substantially opposite from a tip end of said engagement pawl about a center of said reel,
   in which said engagement pawl is extended in a line, and said rib is substantially disposed on said line, and,
   in which the shortest distance defined between said rib and said tip end of said engagement pawl of said reel locking member which is in said reel lock position is shorter than the outside diameter of said reel.

2. The magnetic tape cassette according to claim 1, wherein said cassette half includes a side surface, and said rib protrudes from said side surface.

3. A magnetic tape cassette comprising:
   a reel, on which a magnetic tape is wound, which turns on a predetermined track and has an engaging teeth at its periphery;
   a cassette half having a reel accommodating area which is capable of accommodating various kinds of reels which are different in an outside diameter from one another;

a reel lock member disposed on said cassette half and having an engagement pawl, said reel lock member being slidable between a reel lock position where said engagement pawl of said reel lock member is engaged with said engaging teeth of said reel so as to inhibit a rotation of said reel and a releasing position where said reel lock member disengages from said engaging teeth of said reels so as to allow the rotation of said reel; and a rib disposed on said cassette half for keeping a locking condition where said engagement pawl is engaged with said engaging teeth when said reel leaves from said predetermined tracks, wherein said rib is substantially opposite with a tip end of said engagement pawl about a center of said reel, in which said engagement pawl is extended in a line, and said rib is substantially disposed on said line, and in which said cassette half is formed by injection molding with a main metal mold, and said rib is formed by injection molding with an insert mold which is attachable to said main metal mold.

4. A metal mold used for manufacturing a magnetic tape cassette including, a reel on which a magnetic tape is wound and which turns on a predetermined track and has engaging teeth at its periphery;

a cassette half having a reel accommodating area which is capable of accommodatable various kinds of reels which are different in an outside diameter from one another;

a reel lock member disposed on said cassette half and having an engagement pawl, said reel lock member being slidable between a reel lock position where said engagement pawl of said reel lock member is engaged with said engaging teeth of said reel so as to inhibit a rotation of said reel and a releasing position where said reel lock member disengages from said engaging teeth of said reel so as to allow the rotation of said reels; and a rib disposed on said cassette half for keeping a locking condition where said engagement pawl is engaged with said engaging teeth when said reel leaves from said predetermined track, wherein said rib is substantially opposite from a tip end of said engagement pawl about a center of said reel, said metal mold comprising:

a main metal mold portion forming said cassette half by an injection molding; and an insert metal mold portion being attachable to said main metal mold portion for forming said rib by said injetion molding simultaneously.

* * * * *